Patented June 4, 1940

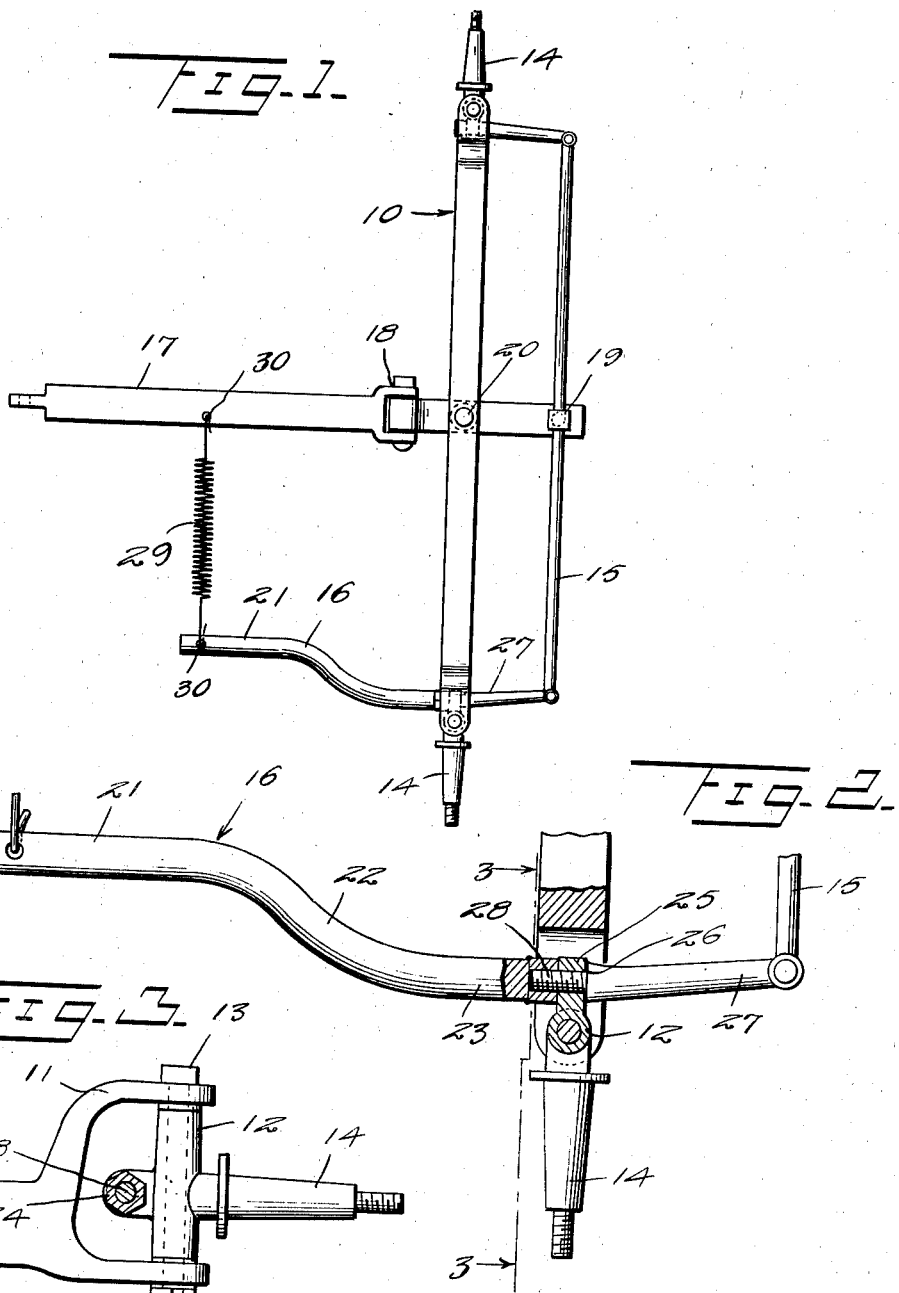

2,203,583

UNITED STATES PATENT OFFICE 2,203,583

ANTISHIMMY DEVICE

Roy C. Stoxen, Marengo, Ill.

Application February 13, 1939, Serial No. 256,165

2 Claims. (Cl. 280—33.55)

The present invention relates to antishimmy means especially adapted for use with trailers and similar vehicles.

An important object of the invention resides in the provision of means associated with the steering means of a trailer chassis and the hitch or towing bar for pulling the same whereby all play and vibration in the front wheel assembly and/or towing bar is reduced.

A further object of the invention resides in the provision of a means having one end attached to the spindle arm of a trailer chassis and the other end attached by spring means with a trailer hitch or towing bar wherein the possibility of the trailer chassis and towing vehicle becoming detached is at least largely precluded, thereby serving as a safety feature for such devices.

The invention will be fully and comprehensively understood from a consideration of the following detailed description when read in connection with the accompanying drawing which forms a part of the application.

In the drawing:

Figure 1 is a top plan view of the device and illustrating the manner of associating the same with the front axle of a trailer chassis.

Figure 2 is a detail view with parts in section and illustrating the manner of uniting the attachment with the steering spindle.

Figure 3 is a sectional view taken substantially on line 3—3 of Figure 2, and

Figure 4 is an enlarged detail view of the end of the attachment rod.

Referring to the drawing for a more detailed description thereof, the device is shown in use with an axle generally designated by the numeral 10 which is a conventional front axle of a trailer or other vehicle being towed. Each end of the axle 10 is formed with a yoke-shaped connection 11 for receiving a spindle 12 supported therebetween by means of a bolt or the like 13, the ground-engaging wheels, not shown, being supported on arms 14 extending from the spindles 12. A tie rod 15 of conventional form is associated with both spindles to cause the same to turn in unison on their respective spindle bolts 12.

The means for preventing shimmying of the front wheels of the trailer or other vehicle being towed, includes a rod 16 preferably disposed on the left side of the trailing vehicle and hitch or towing bar 17, as illustrated in Figure 1 of the drawing. The hitch or towing bar 17 is also of conventional form and is of the type including a swivel connection generally designated by the numeral 18 disposed in front of the axle 10 for permitting up and down motion of said bar as the towing and towed vehicles travel over an uneven surface. The towing bar 17 is clamped by any desired means at 19 with the tie rod 15 and is pivotally connected substantially centrally of the axle 10 at 20, it being understood that the means 19 permits free movement of the tie rod for steering the wheels of the trailer. By this arrangement the towing bar 17 swings about its pivot 20 to actuate the tie rod 15 to cause the front wheels of the trailer to follow in the direction of the towing vehicle.

The antishimmy rod 16 has a portion 21 thereof extending parallel with the towing bar 17 and substantially centrally thereof curves outwardly at 22, the other end 23 thereof also extending substantially parallel to the towing bar 17. The end 23 of the rod 16 has welded or otherwise secured thereto an internally threaded nut 24 for engagement with the spindle arm 12. Referring more particularly to Figure 2 of the drawing, it will be noted that the spindle 12 has extending therefrom and integral therewith an ear 25 having a central opening 26 for receiving the steering arm 27 pivoted to the tie rod 15. The arm 27 is formed with a reduced threaded end 28 adapted to be disposed through the opening 26. The rod 16 is connected to the spindle 12 by attaching the internally threaded nut 24 with the reduced end 28 of the arm 27, and by tightening the same, it will be noted that the spindle arm 14, rod 15 and tie rod arm 27 will operate in unison as the front wheels of the trailer are turned through the medium of the towing bar 17.

A coil spring 29 is disposed between the towing bar 17 and the end 21 of the rod 16 and is supported in openings 30 formed in said members. The spring 29, which is preferably formed of steel or similar material, will provide a tension on the rod 16 that will substantially reduce all play or vibration in the front wheel assembly or tow rod at any rate of speed.

The rod 16 and coil spring 29 will also serve as a safety means in the event that the towing bar 17 should become detached from the tie rod 15. Since the rod 16 is disposed on the left side of the trailer, it will cause a tension which would tend to pull the front wheels of the trailer out of the line of traffic in the event that the towing bar 17 and tie rod 15 should become detached.

Thus it will be seen that there is provided a single attachment having a dual function. In addition to reducing all play or vibration in the front wheel assembly of a trailer, the attachment will also minimize the hazards of accidents occurring when the towing bar becomes detached from the trailing vehicle.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. In combination with an axle of a trailer having a towing bar associated therewith, spindles carried on each end of said axle, a steering arm associated with each of said spindles, a tie rod pivotally connected to said steering arms, one of said steering arms being formed with a reduced threaded end, a vibration reducing rod, said rod being disposed substantially parallel to said towing bar and having one end flexibly attached thereto, the other end of said vibration reducing rod being formed with an internally threaded nut for receiving the reduced threaded end of said steering arm, whereby vibration of the steering means of said trailer is substantially reduced.

2. In combination with an axle of a trailer having a towing bar associated therewith, spindles carried on each end of said axle, a steering arm associated with each of said spindles, a tie rod pivotally connected to said steering arms, one of said steering arms being formed with a reduced threaded end, a vibration reducing rod, said rod being disposed substantially parallel to said towing rod and being positioned on the side of the trailer of the vehicle adjacent the path of oncoming traffic, one end of said vibration reducing rod being flexibly attached to said towing bar and the other end thereof being formed with an internally threaded nut for receiving the reduced threaded end of said steering arm, whereby vibration of the steering means of said trailer is substantially reduced.

ROY C. STOXEN.